US012691521B2

(12) United States Patent
Kondou

(10) Patent No.: US 12,691,521 B2
(45) Date of Patent: Jul. 28, 2026

(54) WELDING CONDITION SETTING ASSISTANCE DEVICE

(71) Applicant: Panasonic Intellectual Property Management Co., Ltd., Osaka (JP)

(72) Inventor: Akinobu Kondou, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 973 days.

(21) Appl. No.: 17/936,399

(22) Filed: Sep. 29, 2022

(65) Prior Publication Data

US 2023/0018730 A1      Jan. 19, 2023

Related U.S. Application Data

(63) Continuation of application No. PCT/JP2021/016893, filed on Apr. 28, 2021.

(30) Foreign Application Priority Data

May 15, 2020      (JP) ................................. 2020-086163

(51) Int. Cl.
*B23K 9/095* (2006.01)
*B23K 31/12* (2006.01)
(Continued)

(52) U.S. Cl.
CPC .......... B23K 9/0956 (2013.01); B23K 31/125 (2013.01); G06T 7/0004 (2013.01);
(Continued)

(58) Field of Classification Search
CPC ........ B23K 9/0956; B23K 31/125; G06T 7/90
(Continued)

(56) References Cited

U.S. PATENT DOCUMENTS 9,836,987 B2 * 12/2017 Postlethwaite ........ G09B 19/24
2022/0084192 A1     3/2022 Kondou et al.

FOREIGN PATENT DOCUMENTS

JP      2008126274 A  *  6/2008
JP      2008238187 A  * 10/2008
(Continued)

OTHER PUBLICATIONS

International Search Report of PCT application No. PCT/JP2021/016893 dated Jul. 6, 2021.

*Primary Examiner* — Steven W Crabb
*Assistant Examiner* — Alba T Rosario-Aponte
(74) *Attorney, Agent, or Firm* — Wenderoth, Lind & Ponack, L.L.P.

(57) ABSTRACT

A processor is configured to perform: a spatter candidate region detection step of performing, for each of input images obtained by capturing a workpiece during arc welding, detection of a spatter candidate region based on a pixel value indicating brightness of a pixel included in the input images; a reflected light region identification step of identifying, in the spatter candidate region detected in the spatter candidate region detection step, a reflected light region in which reflected light of arc light is shown, based on color information of a predetermined reference pixel included in the spatter candidate region; and a spatter number identification step of identifying, as a number of spatters, a number of spatter candidate regions obtained by removing the reflected light region identified in the reflected light region identification step in the spatter candidate region detected in the spatter candidate region detection step.

4 Claims, 8 Drawing Sheets

(51) Int. Cl.
    *G06T 7/00*     (2017.01)
    *G06T 7/90*     (2017.01)

(52) U.S. Cl.
    CPC ...... *G06T 7/90* (2017.01); *G06T 2207/10024*
        (2013.01); *G06T 2207/10152* (2013.01); *G06T*
          *2207/30164* (2013.01); *G06T 2207/30242*
               (2013.01)

(58) Field of Classification Search
    USPC .................................................. 219/130.21
    See application file for complete search history.

(56)                References Cited

FOREIGN PATENT DOCUMENTS

| | | | |
|---|---|---|---|
| JP | 2009-028775 | 2/2009 | |
| KR | 20170055337 A * | 5/2017 | ......... G01R 31/1218 |
| WO | 2019/239644 | 12/2019 | |
| WO | 2020/246416 | 12/2020 | |

* cited by examiner

WELDING CONDITION SETTING ASSISTANCE DEVICE

CROSS-REFERENCE TO RELATED APPLICATIONS

This application is a continuation application of PCT International Application No. PCT/JP2021/016893 filed on Apr. 28, 2021, which claims the benefit of foreign priority of Japanese Patent Application No. 2020-086163 filed on May 15, 2020, the contents all of which are incorporated herein by reference.

TECHNICAL FIELD

The present disclosure relates to a device that assists setting of a welding condition when arc welding is performed by generating an arc between a workpiece and an electrode by applying a voltage between the workpiece and the electrode.

BACKGROUND ART

A welding condition setting assistance device disclosed in WO 2019/239644 A detects spatters based on a pixel value indicating brightness of a pixel included in an input image and identifies the number of the detected spatters in each of input images obtained by capturing a workpiece during arc welding.

SUMMARY OF THE INVENTION

Technical Problem

However, in WO 2019/239644 A, since the spatters are detected based on the pixel value indicating the brightness of the pixel included in the input images, arc light reflected from a peripheral device may be erroneously detected as spatters, and the number of spatters may not be capable of being accurately identified. However, in WO 2019/239644 A, any measure against corresponding problems is not taken.

The present disclosure has been made in view of such a point, and an object of the present disclosure is to identify the number of spatters of the input images more accurately.

Solution to Problem

According to one aspect of the present disclosure, there is a welding condition setting assistance device that assists setting of a welding condition when arc welding is performed by generating an arc between a workpiece and an electrode by applying a voltage between the workpiece and the electrode, the welding condition setting assistance device including an image processing unit that performs: a spatter candidate region detection step of performing, for each of input images obtained by capturing the workpiece during the arc welding, detection of a spatter candidate region based on a pixel value indicating brightness of a pixel included in the input images; a reflected light region identification step of identifying, in the spatter candidate region detected in the spatter candidate region detection step, a reflected light region in which reflected light of arc light is shown, based on color information of a predetermined reference pixel included in the spatter candidate region; and a spatter number identification step of identifying, as the number of spatters of each of the input images, the number of spatter candidate regions obtained by removing the reflected light region identified in the reflected light region identification step in the spatter candidate region of each of the input images, the spatter candidate region being detected in the spatter candidate region detection step.

According to the aspect, in the spatter candidate region detection step, even when the region in which the reflected light of the arc light from the peripheral device is shown is detected as the spatter candidate region, the number of spatter candidate regions obtained by removing the reflected light region in which the reflected light of the arc light is shown is identified as the number of sputters in the spatter candidate region detected in the spatter candidate region detection step, and thus the number of sputters of the input images can be identified more accurately.

Advantageous Effects of Invention

According to the welding condition setting assistance device of the present disclosure, the number of spatters in the input images can more accurately be identified.

DESCRIPTION OF EMBODIMENT

Hereinafter, an exemplary embodiment of the present disclosure is described with reference to the drawings. The following description of a preferable exemplary embodiment is merely illustrative in nature and is not intended to limit the present disclosure, application thereof, or use thereof.

Figure 1:
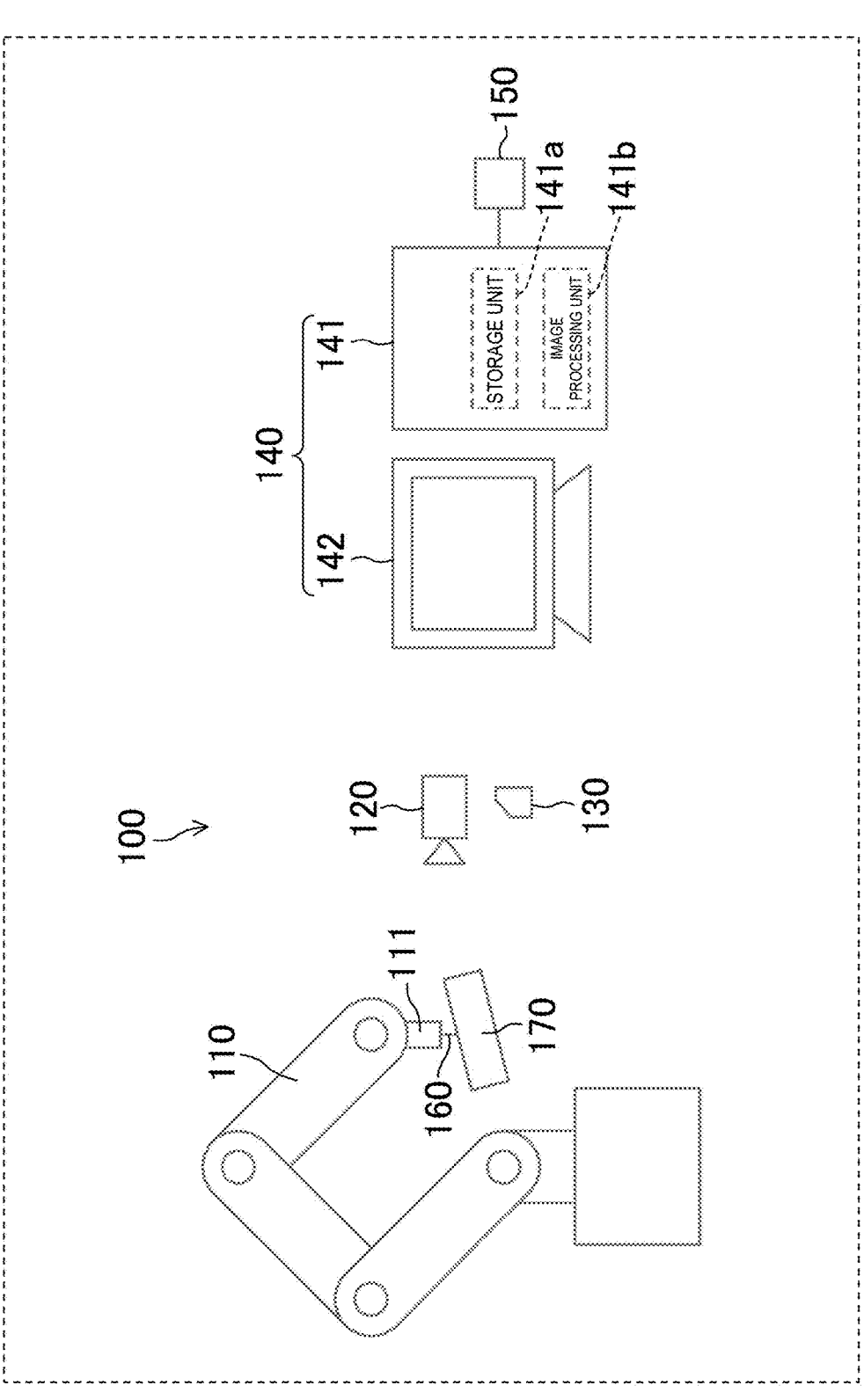
FIG. 1 is a diagram illustrating a schematic configuration of a welding system including a computer as a welding condition setting assistance device according to an exemplary embodiment of the present disclosure.

FIG. 1 illustrates welding system 100. Welding system 100 includes welding robot 110, video camera 120, memory card 130 housed in video camera 120, computer 140 as a welding condition setting assistance device according to the exemplary embodiment of the present disclosure, and card reader 150 connected to computer 140.

Figure 2:
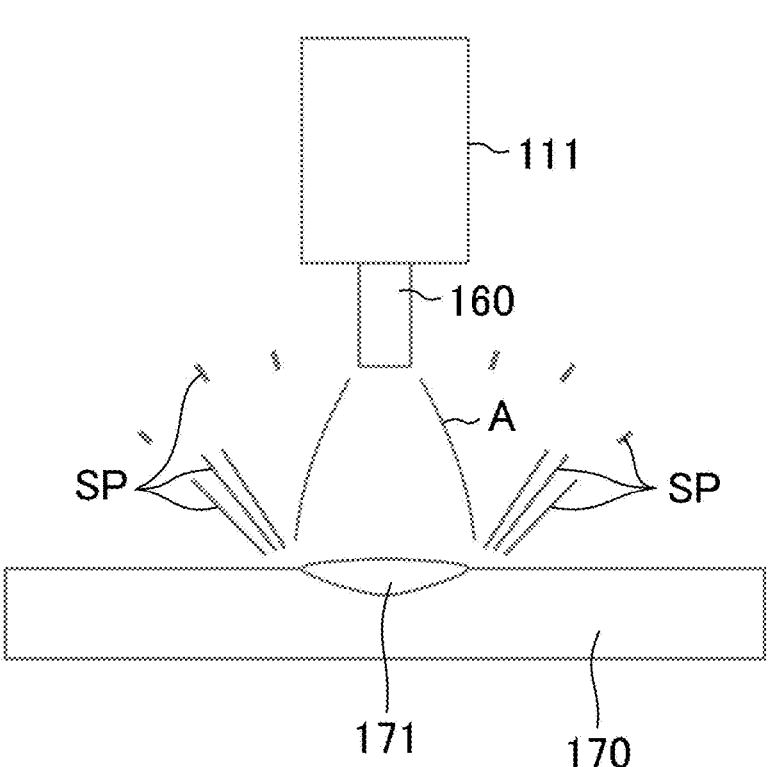
FIG. 2 is an explanatory diagram illustrating spatters generated during arc welding.

As also illustrated in FIG. 2, welding robot 110 includes welding torch 111 capable of holding welding wire 160, and generates arc A between workpiece 170 and welding wire 160 to perform arc welding by applying a voltage between workpiece 170 held by a welding jig (clamp) and welding wire 160 as an electrode held by welding torch 111. During arc welding, a portion to be welded of workpiece 170 is melted to form molten pool 171, and spatters SP are scattered from molten pool 171. Note that a jet hole (not illustrated) for jetting a shield gas is provided at a tip of welding torch 111.

Video camera 120 is installed at a position where an entire scattering region of spatters SP including entire workpiece 170 can be captured via a neutral density (ND) filter (not illustrated), and stores a captured moving image in memory card 130. Note that a frame rate (capturing speed) of video camera 120 is set to 60 fps. Furthermore, the focus and aperture of video camera 120, and the shutter speed of an electronic shutter are fixed.

Computer 140 includes computer main body 141 and display 142. Computer main body 141 includes storage unit 141*a* and image processing unit 141*b*.

Storage unit 141*a* of computer main body 141 stores a trained model generated by supervised training using a plurality of images in which spatters SP are captured and a plurality of images in which spatters SP are not captured as training data. As a technique of supervised training for generating a trained model, for example, deep learning is used. Furthermore, storage unit 141*a* further stores a moving image captured by video camera 120 and a plurality of still images obtained by dividing the moving image.

Image processing unit 141*b* of computer main body 141 reads the moving image stored in memory card 130 inserted into card reader 150, and stores the moving image in storage unit 141*a*. Furthermore, image processing unit 141*b* divides the moving image stored in storage unit 141*a* into still images (frames), and stores the still images in storage unit 141*a* as input images. Furthermore, image processing unit 141*b* generates processed image I (see FIG. 8) obtained by performing predetermined processing on each of a plurality of the input images stored in storage unit 141*a*. Details of a generating method of processed image I will be described later.

Display 142 displays processed image I generated by image processing unit 141*b* of computer main body 141.

Figure 3:
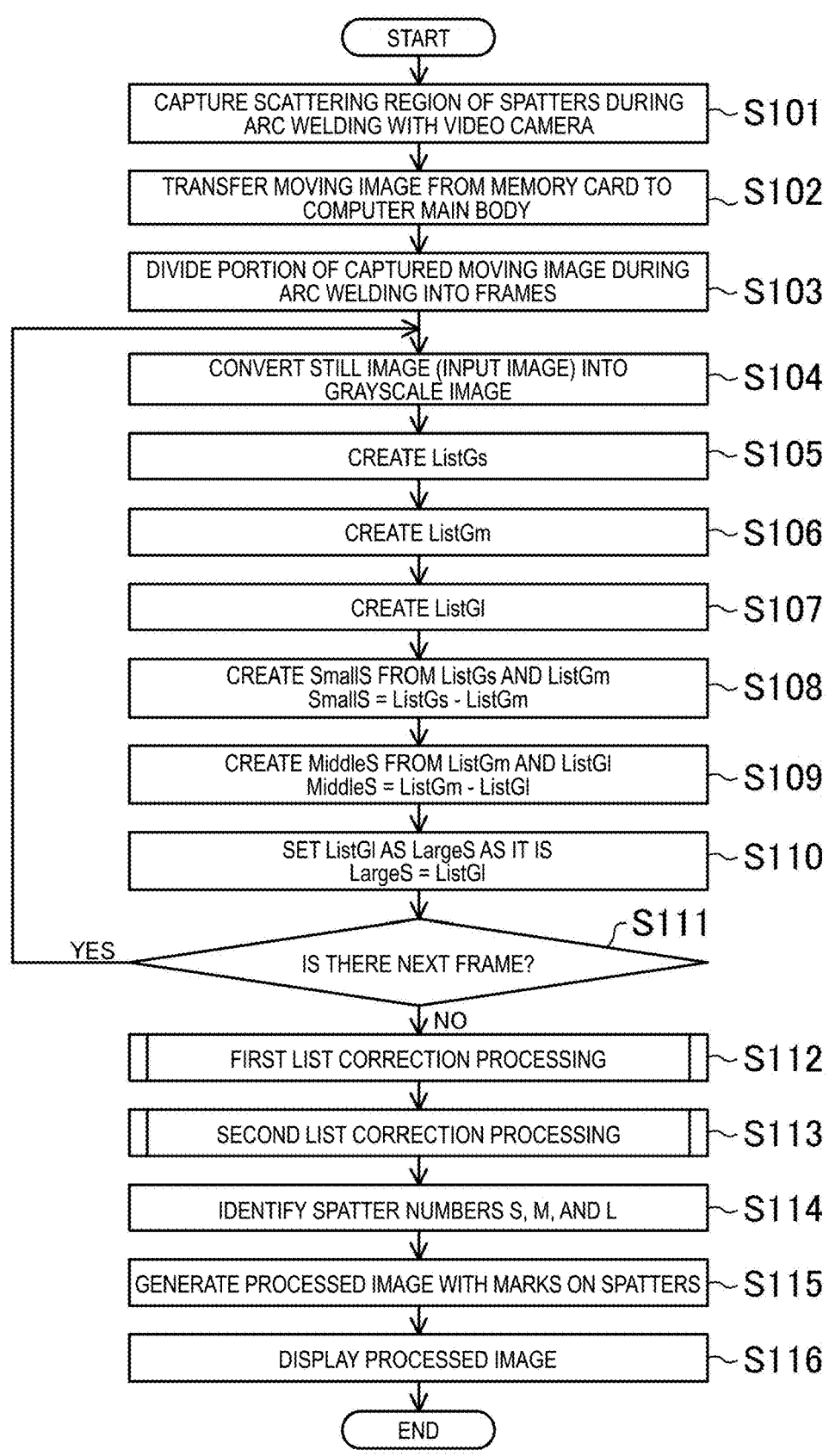
FIG. 3 is a flowchart illustrating a procedure of identifying the number of spatters by using a computer as a welding condition setting assistance device according to an exemplary embodiment of the present disclosure.

Hereinafter, a procedure for setting a welding condition of welding system 100 will be described with reference to FIG. 3.

First, in (S101), a user causes video camera 120 to capture an image while causing welding robot 110 to perform arc welding, and stores the captured moving image in memory card 130. As a result, the moving image of the entire scattering region of spatters SP including entire workpiece 170 during arc welding is stored in memory card 130. At this time, the frame rate of the captured and stored moving image is 60 fps.

Next, in (S102), the user takes out memory card 130 from video camera 120, inserts memory card 130 into card reader 150, and transfers the moving image stored in memory card 130 from card reader 150 to computer main body 141. Then, image processing unit 141*b* of computer main body 141 receives the moving image transferred from card reader 150, and stores the moving image in storage unit 141*a*.

Next, in (S103), the user causes image processing unit 141*b* of computer main body 141 to divide the moving image during arc welding stored in storage unit 141*a* into a plurality of still images (frames), and store all the still images in storage unit 141*a* as input images. At this time, 60 input images are stored in storage unit 141*a* per one second moving image. Each input image is a color image, and a color of each pixel is expressed by color information defined in an RGB color space.

Next, in (S104), image processing unit 141*b* converts, into a grayscale image, an input image that has not yet been converted into a grayscale image among the input images stored in storage unit 141*a*.

Figure 4:
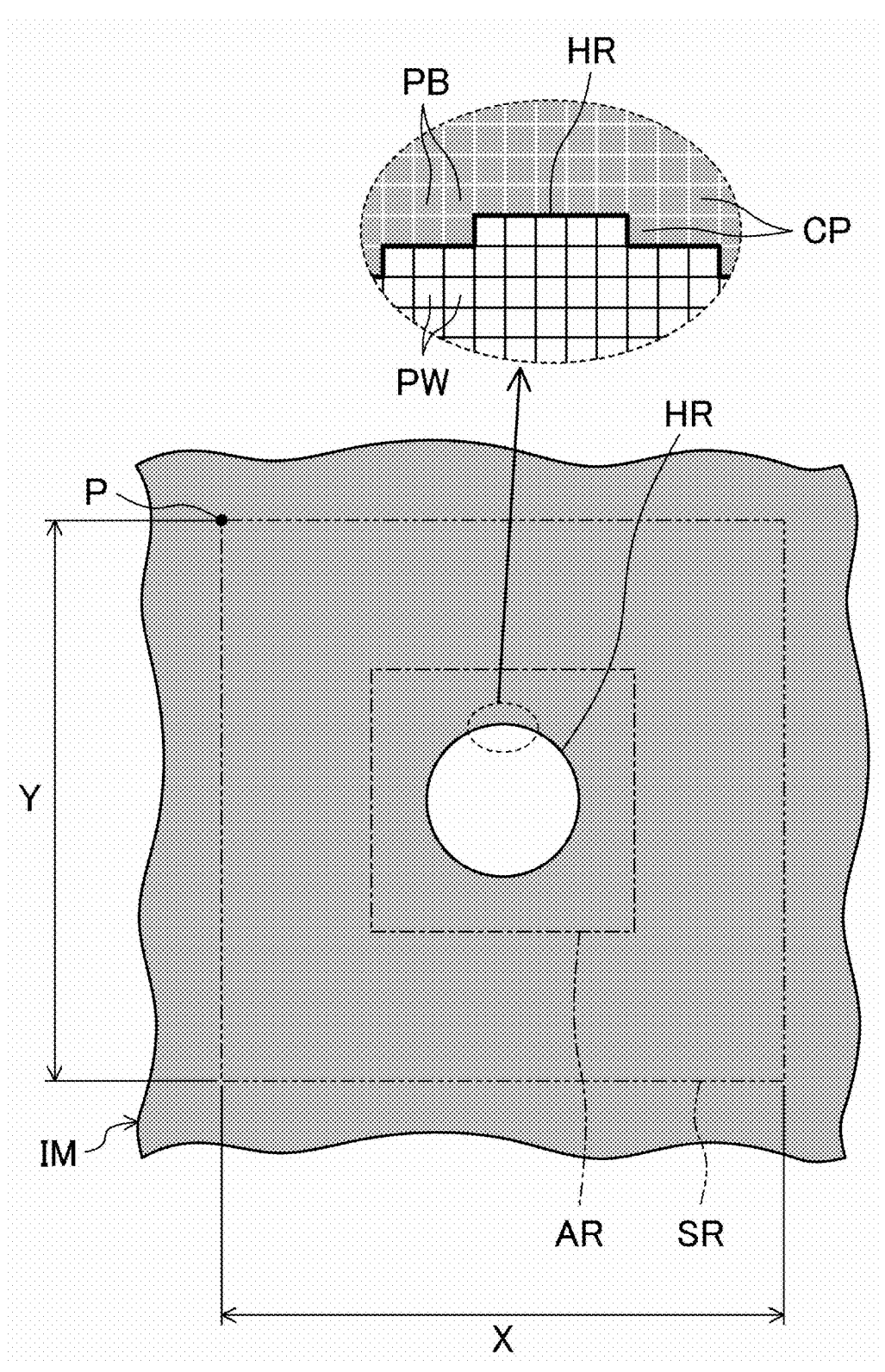
FIG. 4 is an explanatory diagram illustrating detected spatters.

Next, in (S105), for the grayscale image obtained in (S104), image processing unit 141*b* performs processing of converting a pixel value of a pixel having a pixel value less than or equal to predetermined threshold Gs into a value (0) indicating black, and sets the result as spatter detection target image IM. As a result, the pixel having a pixel value indicating brightness exceeding predetermined threshold Gs is identified as a pixel other than black. Then, for example, as illustrated in FIG. 4, spatter candidate region SR including high luminance region HR in which a plurality of pixels other than black in spatter detection target image IM are continuous is detected (spatter candidate region detection step). In FIG. 4, PB represents a black pixel, and PW represents a pixel other than black. Spatter candidate region SR is a square region. High luminance region HR is located in a region excluding an outer peripheral portion of spatter candidate region SR. In the example of FIG. 4, high luminance region HR is located at the center of spatter candidate region SR. Here, the detection of spatter candidate region SR is performed using the trained model stored in storage unit 141*a*. Then, first spatter list ListGs that identifies all detected spatter candidate regions SR is created.

Next, in (S106), for the grayscale image obtained in (S104), image processing unit 141*b* performs processing of converting a pixel value of a pixel having a pixel value less than or equal to predetermined threshold Gm into a value (0) indicating black. Then, spatter candidate region SR including high luminance region HR in which a plurality of pixels other than black in the processed image are continuous is detected. Here, the detection of spatter candidate region SR is also performed using the trained model stored in storage unit 141*a*. Note that threshold Gm is set to a value greater than threshold Gs. Then, second spatter list ListGm that identifies all detected spatter candidate regions SR is created.

Next, in (S107), for the grayscale image obtained in (S104), image processing unit 141*b* performs processing of converting a pixel value of a pixel having a pixel value less than or equal to predetermined threshold Gl into a value (0) indicating black. Then, spatter candidate region SR including high luminance region HR in which a plurality of pixels other than black in the processed image are continuous is detected. Here, the detection of spatter candidate region SR is also performed using the trained model stored in storage unit 141*a*. Note that threshold Gl is set to a value greater than threshold Gm. Then, third spatter list ListGl that identifies all detected spatter candidate regions SR is created. Note that in first spatter list ListGs, second spatter list ListGm, and third spatter list ListGl, spatter candidate region SR is identified by coordinates of upper left pixel P, length X in a lateral direction, and length Y in a vertical direction.

Here, since the brightness of spatters SP increases as the size of spatters SP increases, spatters SP shown in spatter candidate region SR identified in (S105) to (S107) becomes spatters SP having the sizes greater than the sizes corresponding to thresholds Gs, Gm, and Gl, respectively.

Next, in (S108), image processing unit 141*b* creates small spatter list SmallS that identifies spatter candidate region SR obtained by removing spatter candidate region SR identified by second spatter list ListGm from spatter candidate region SR identified by first spatter list ListGs.

Subsequently, in (S109), image processing unit 141*b* creates middle spatter list MiddleS that identifies spatter candidate region SR obtained by removing spatter candidate region SR identified by third spatter list ListGl from spatter candidate region SR identified by second spatter list ListGm.

Subsequently, in (S110), image processing unit 141*b* sets third spatter list ListGl as large spatter list LargeS as it is.

Next, in (S111), image processing unit 141*b* determines whether or not the input images (frames) that have not yet been subjected to conversion into the grayscale images (processing of (S104) to (S110)) remain in storage unit 141*a*. Then, in a case where the input images not converted into the grayscale images remain, the process returns to (S104), and in a case where the input images not converted into the grayscale images do not remain, the process proceeds to (S112).

Then, in (S112), image processing unit 141*b* performs the following first list correction processing.

Figure 5:
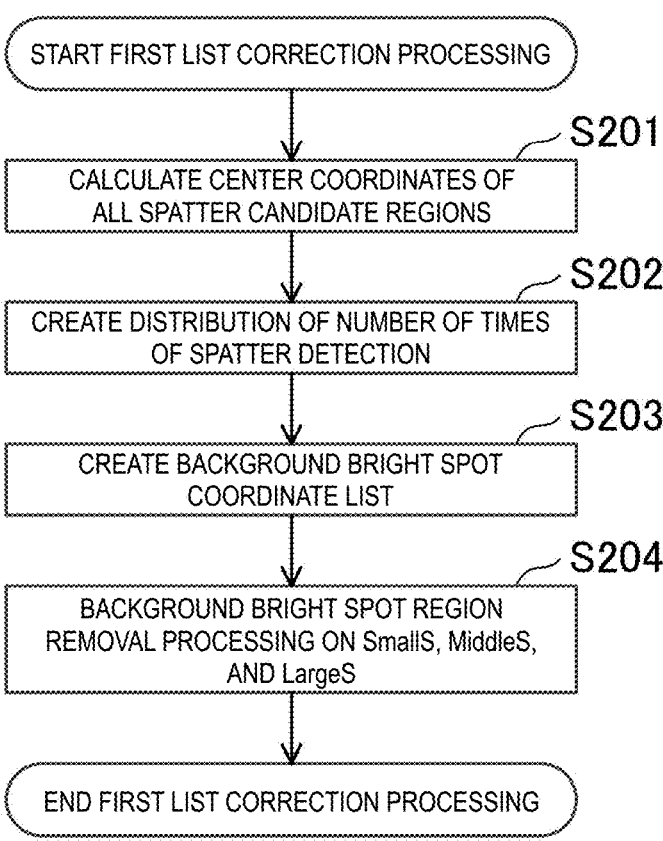
FIG. 5 is a flowchart illustrating a procedure of first list correction processing.

FIG. 5 illustrates a procedure of the first list correction processing performed in (S112).

In (S112), first, in (S201), image processing unit 141*b* detects the center coordinates of all spatter candidate regions SR detected in all the input images stored in storage unit 141*a*. That is, image processing unit 141*b* calculates the center coordinates of all spatter candidate regions SR identified by first spatter list ListGs of all the input images.

Next, in (S202), for positions (coordinates) on the input images, image processing unit 141*b* calculates the number of times calculated as the center coordinates of spatter candidate region SR in (S201) as the number of times of spatter detection, and stores distribution of the number of times of the spatter detection.

Next, in (S203), image processing unit 141*b* identifies, as a background bright spot, coordinates (a position) on the input images at which the number of times of spatter detection calculated in (S202) is greater than or equal to a predetermined reference number of times. Then, a background bright spot coordinate list for identifying coordinates of the background bright spot is created.

Next, in (S204), for all the input images stored in storage unit 141*a*, image processing unit 141*b* performs background bright spot region removal processing of removing spatter candidate region SR in which the center coordinates are present in the background bright spot coordinate list created in (S203) from small spatter list SmallS, middle spatter list MiddleS, and large spatter list LargeS. That is, spatter candidate region SR removed by the background bright spot region removal processing is a region in which the number of times of detection as spatter candidate region SR is greater than or equal to a predetermined reference number of times in all spatter candidate regions SR identified by first spatter list ListGs of all the input images.

Figure 6:
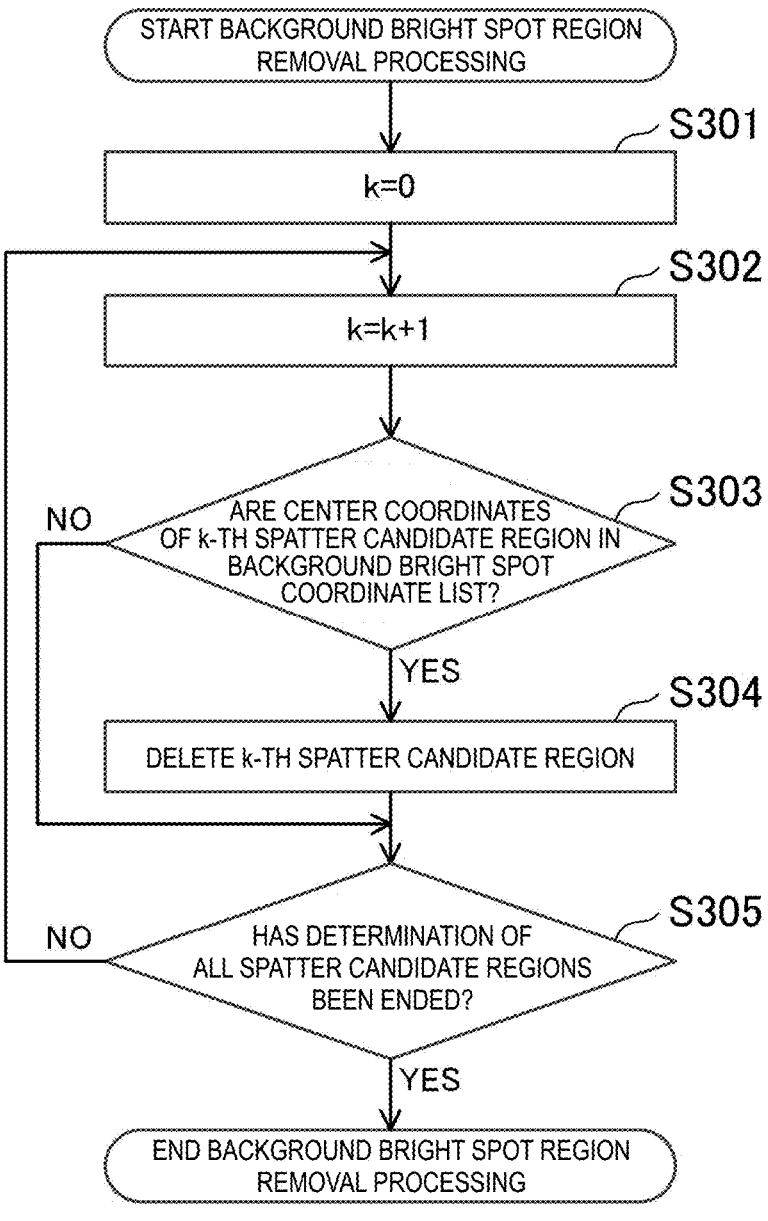
FIG. 6 is a flowchart illustrating a procedure of background bright spot region removal processing.

Here, a specific procedure of the background bright spot region removal processing for small spatter list SmallS will be described with reference to FIG. 6. The background bright spot region removal processing for middle spatter list MiddleS and large spatter list LargeS is also performed by the same procedure.

First, in (S301), k=0 is set by image processing unit 141*b*.

Next, in (S302), k=k+1 is set by image processing unit 141*b*.

Next, in (S303), image processing unit 141*b* determines whether or not the center coordinates of k-th spatter candidate region SR of small spatter list SmallS is present in the background bright spot coordinate list. In a case where the center coordinates of k-th spatter candidate region SR are not present in the background bright spot coordinate list, the process proceeds to (S305), and in a case where the center coordinates are present, k-th spatter candidate region SR of small spatter list SmallS is identified as the background bright spot region, and the process proceeds to (S304).

In (S304), image processing unit 141*b* deletes k-th spatter candidate region SR from small spatter list SmallS.

In (S305), image processing unit 141*b* determines whether or not the determination in (S303) has been performed for all spatter candidate regions SR of small spatter list SmallS, and in a case where the determination has not been performed, the process returns to (S302), and in a case where the determination has been performed, the background bright spot region removal processing is ended.

Next, in (S113), image processing unit 141*b* performs the following second list correction processing for all the input images. In the second list correction processing, the following reflected light region removal processing is performed on small spatter list SmallS, middle spatter list MiddleS, and large spatter list LargeS after the first list correction processing.

Figure 7:
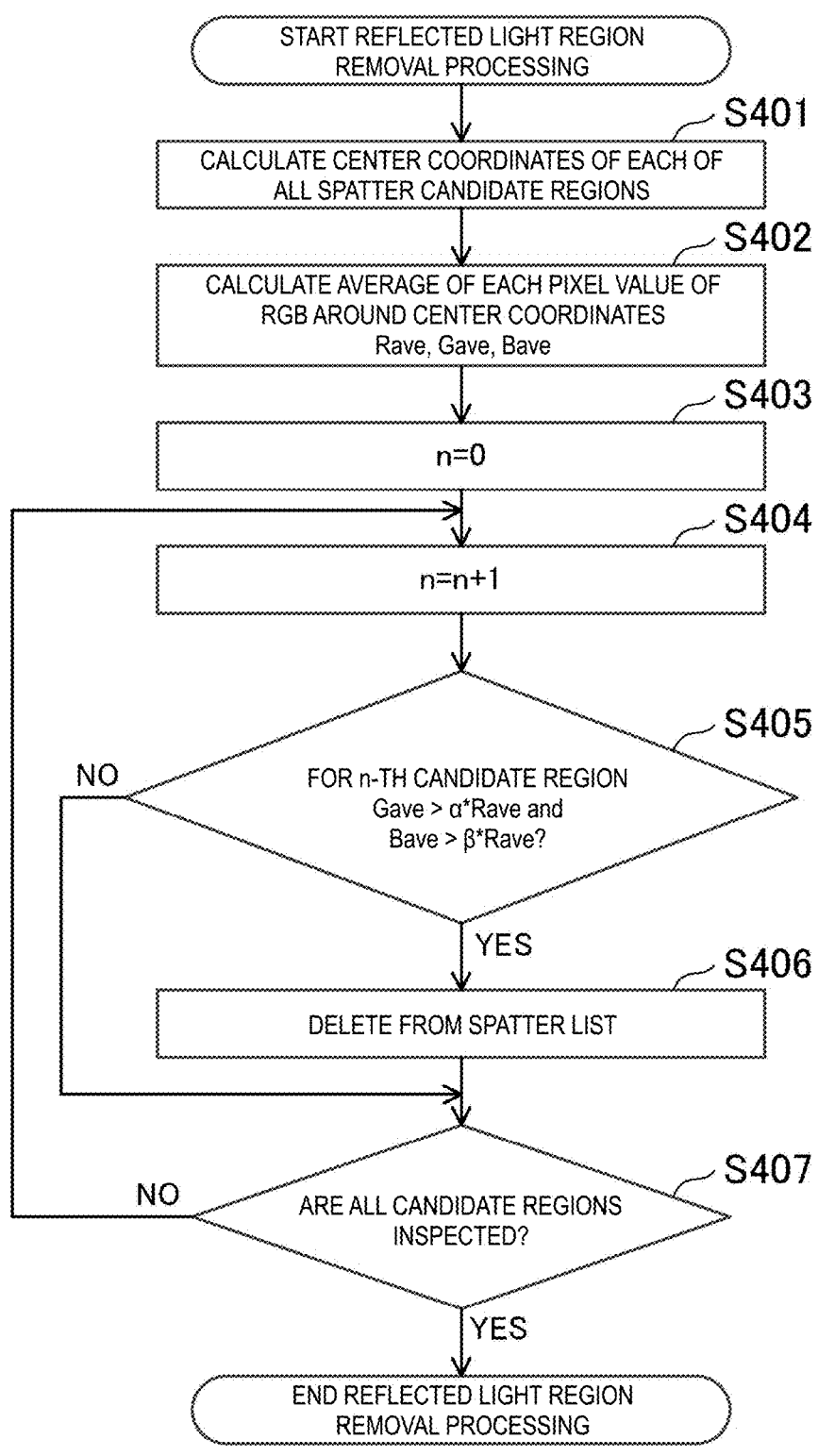
FIG. 7 is a flowchart illustrating a procedure of reflected light region removal processing.

Here, a specific procedure of the reflected light region removal processing for small spatter list SmallS will be described with reference to FIG. 7. The reflected light region removal processing for middle spatter list MiddleS and large spatter list LargeS is also performed by the same procedure.

First, in (S401), image processing unit 141*b* calculates the center coordinates of all spatter candidate regions SR identified by small spatter list SmallS stored in storage unit 141*a*.

Next, in (S402), image processing unit 141*b* calculates, for all spatter candidate regions SR identified by the small spatter list SmallS, an average value of a red component, an average value of a green component, and an average value of a blue component in color information of predetermined reference pixel CP (see FIG. 4) around the center coordinates calculated in (S401). Here, reference pixel CP means all pixels included in square average value calculation region AR having a center portion common to the center portion of spatter candidate region SR. The area of average value calculation region AR is set to 90% of the area of spatter candidate region SR.

Next, in (S403), n=0 is set by image processing unit 141*b*.

Next, in (S404), n=n+1 is set by image processing unit 141*b*.

Then, in (S405), image processing unit 141*b* refers to the calculation result in (S402) for n-th spatter candidate region SR of small spatter list SmallS, and determines whether or not a condition is satisfied that average value Gave of the green component in the color information of reference pixel CP is greater than the product of first set value α and average value Rave of the red component in the color information of the reference pixel CP, and average value Bave of the blue component in the color information of reference pixel CP is greater than the product of second set value β and average value Rave of the red component in the color information of reference pixel CP. First set value α and second set value β are set to values of one or greater. Preferably, first set value α is set to greater than or equal to 1.35, and second set value β is set to greater than or equal to 1.31. Then, in a case where the condition is satisfied, n-th spatter candidate region SR of small spatter list SmallS is identified as a reflected light region in which reflected light of arc light is shown, and the process proceeds to (S406). That is, spatter candidate region SR satisfying the condition is identified as the reflected light region. On the other hand, in a case where the condition is not satisfied, the process proceeds to (S407).

In (S406), image processing unit 141*b* deletes n-th spatter candidate region SR from small spatter list SmallS.

In (S407), image processing unit 141*b* determines whether or not the determination in (S405) has been performed for all spatter candidate regions SR of small spatter list SmallS, and in a case where the determination has not been performed, the process returns to (S404), and in a case where the determination has been performed, the reflected light region removal processing is ended.

Next, in (S114), image processing unit 141b identifies the number of spatter candidate regions SR identified by small spatter list SmallS after the correction processing as spatter number S of small spatters SP. Furthermore, the number of spatter candidate regions SR identified by middle spatter list SmallM after the correction processing is identified as spatter number M of spatters SP having a medium size. Moreover, the number of spatter candidate regions SR identified by large spatter list LargeS after the correction processing is identified as spatter number L of large spatters SP. As described above, even when light of arc A is reflected from the peripheral devices such as the welding jig (clamp), the welding torch 111, and the main body of the welding robot 110, and the region in which the reflected light from the peripheral devices is shown is detected as spatter candidate region SR in (S105) to (S107), the background bright spot region identified in (S112) and the reflected light region identified in (S113) are removed from small spatter list SmallS, middle spatter list MiddleS, and large spatter list LargeS, and thus the spatter numbers S, M, and L can be identified more accurately.

Figure 8:
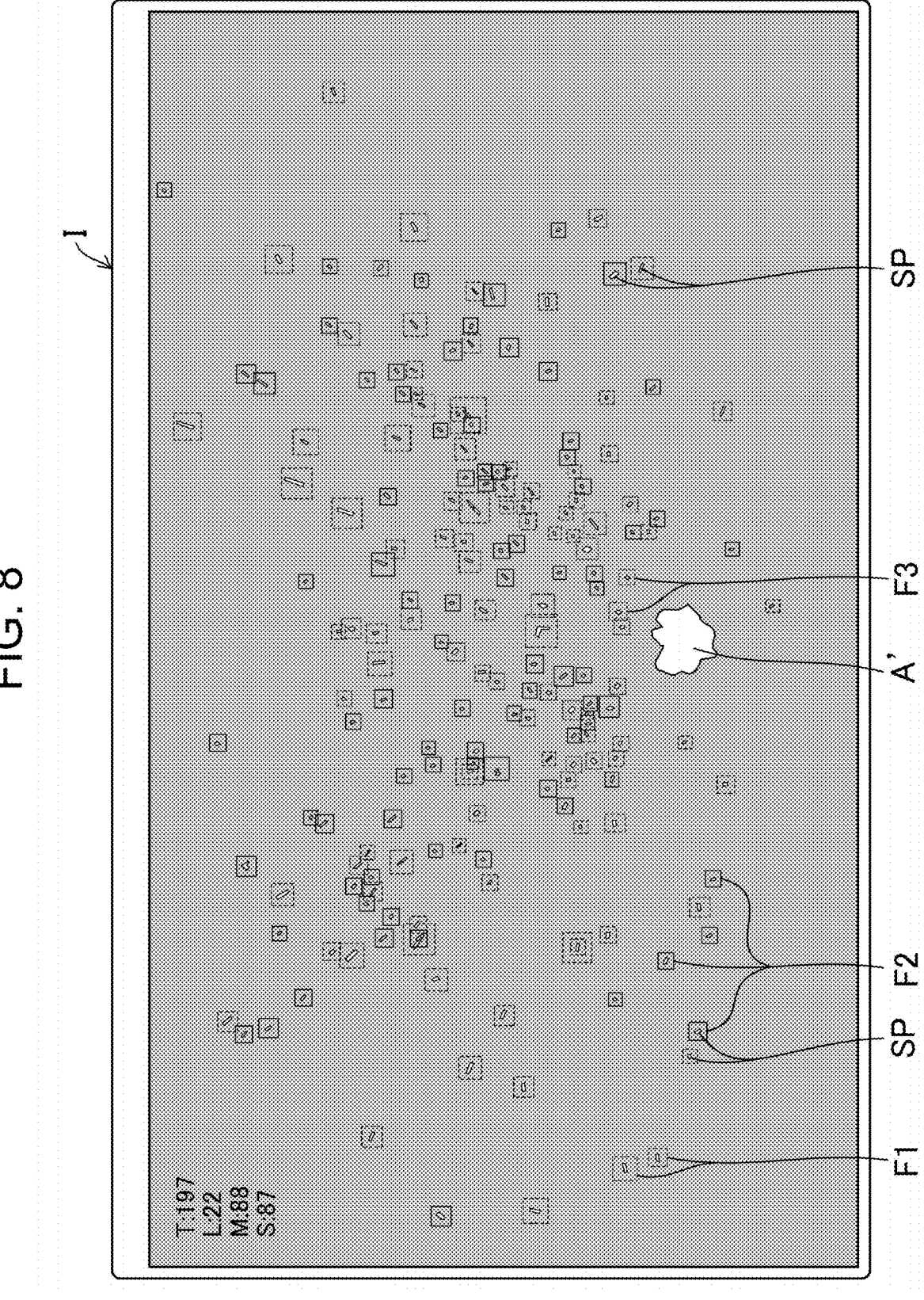
FIG. 8 is an explanatory diagram illustrating a processed image.

In (S115), image processing unit 141b identifies the sum of spatter numbers S, M, and L as total spatter number T. Moreover, as illustrated in FIG. 8, image processing unit 141b generates processed image I subjected to processing of providing indications of spatter numbers S, M, and L and the total spatter number T at the upper left corner of the image with respect to each input image, and processing of surrounding spatter candidate region SR identified by small spatter list SmallS after the correction processing in (S112) and (S113) with blue rectangular frame F1, surrounding spatter candidate region SR identified by middle spatter list MiddleS after the correction processing in (S112) and (S113) with yellow rectangular frame F2, and surrounding spatters SP identified by large spatter list LargeS after the correction processing in (S112) and (S113) with red rectangular frame F3. Note that, in FIG. 8, blue frame F1 is indicated by a broken line, yellow frame F2 is indicated by a solid line, and red frame F3 is indicated by a dotted line. Furthermore, in FIG. 8, A' indicates light of arc A and light of arc A reflected from a fume. Total spatter number T is the number of spatter candidate regions SR obtained by removing the background bright spot region identified in (S112) for three lists SmallS, MiddleS, and LargeS and the reflected light region identified in (S113) for three lists SmallS, MiddleS, and LargeS from spatter candidate region SR identified by the first spatter list ListGs.

As described above, in (S112) to (S115), image processing unit 141b performs a reflected light region identification step of identifying a reflected light region in which reflected light of arc light is shown from spatter candidate region SR detected in (S105) based on color information of predetermined reference pixel CP included in each spatter candidate region SR, a background bright spot region identification step of identifying, as a background bright spot region, a region in which the number of times of detection as spatter candidate region SR in (S105) is greater than or equal to a predetermined reference number of times, and a spatter number identification step of identifying, as total spatter number T of each input image, the number of spatter candidate regions SR obtained by removing the reflected light region identified in the reflected light region identification step and the background bright spot region identified in the background bright spot region identification step in spatter candidate region SR detected in (S105).

In (S116), display 142 displays processed image I generated in (S115). The user determines the suitability of a welding condition such as a voltage value applied between workpiece 170 and welding wire 160 with reference to spatter numbers S, M, and L and total spatter number T which are displayed on display 142. In a case where the user determines that the welding condition is inappropriate, the user changes the welding condition so as to reduce the number of large spatters SP, and performs the processing of (S101) to (S116) again. Furthermore, at this time, since spatters SP are displayed on display 142 with frames F1, F2, and F3 of colors corresponding to the sizes of spatters SP, the user can determine the reliability of spatter numbers S, M, L, and T displayed on display 142 with reference to these frames F1, F2, and F3.

In a case where the frame rate of video camera 120 is different from the frequency of a welding current, the arc light is not necessarily generated at capturing timing of the input images. Therefore, although the peripheral device that reflects the arc light is present in a capturing range, the number of input images in which the reflected light from the peripheral device is shown decreases, and in (S112), a region in which the reflected light from the peripheral device is shown cannot be identified as the background bright spot region in some cases. However, even in such a case, in the present exemplary embodiment, the reflected light region in each input image is identified based on the color information of reference pixel CP of spatter candidate region SR, and both the background bright spot region and the reflected light region are removed from small spatter list SmallS, middle spatter list MiddleS, and large spatter list LargeS, and thus spatter numbers S, M, and L can be identified more accurately as compared with the case of removing only the background bright spot region.

Furthermore, in a case where the peripheral device present in the capturing range is irradiated with light of a red light emitting diode (LED) configuring a pilot lamp of a machine or reddish external light from a light source constantly lit, such as sunlight, in (S113), a region in which the reflected light of the reddish external light is shown cannot be identified as the reflected light region in some cases. However, even in such a case, in the present exemplary embodiment, the background bright spot region in which the number of times of detection as spatter candidate region SR is greater than or equal to a predetermined reference number of times is identified, and both the background bright spot region and the reflected light region are removed from small spatter list SmallS, middle spatter list MiddleS, and large spatter list LargeS, and thus spatter numbers S, M, and L can be identified more accurately as compared with the case of removing only the reflected light region.

Furthermore, arc A is generally about 5000° C. to 20000° C. in temperature and generates pale blue light. On the other hand, the temperature of spatters SP is about 700° C. to 1300° C. lower than the temperature of arc A, and generates reddish light. Therefore, according to the present exemplary embodiment, since spatter candidate region SR in which the average value of the green component in the color information of the reference pixel CP is greater than the product of the first set value $\alpha$ and the average value of the red component, and the average value of the blue component in the color information of the reference pixel CP is greater than the product of the second set value $\beta$ and the average value of the red component is identified as the reflected light region, it is easy to identify spatter candidate region SR, in which the reflected light of the arc A is shown instead of spatters SP, as the reflected light region.

Furthermore, since image processing unit 141*b* identifies the reflected light region based on the average value of the color information of reference pixel CP included in average value calculation region AR obtained by removing the outer peripheral portion of spatter candidate region SR, the color information of the pixels in a dark region (region other than high luminance region HR) in the outer peripheral portion does not affect the identification of the reflected light region. Therefore, as compared with the case of identifying the reflected light region based on the average value of the color information of the pixels of entire spatter candidate region SR, the color information of the pixels of high luminance region HR can be more remarkably applied to the identification of the reflected light region.

Furthermore, in general, even when small spatters SP adhere to workpiece 170, spatters SP can be easily removed with a metal brush or the like. On the other hand, when large spatters SP adhere to workpiece 170, spatters SP cannot be removed without polishing with a grinder or the like, and the number of steps required for removal increases. According to the present exemplary embodiment, since the number of spatters SP having various sizes, that is, spatter numbers S, M, and L are displayed on display 142 in (S116), the user can accept the occurrence of small spatters SP, and set a welding condition so as to suppress the occurrence of large spatters SP with reference to spatter numbers S, M, and L. Therefore, the number of steps required to remove spatters SP can be reduced.

Furthermore, in (S105) to (S107), image processing unit 141*b* detects spatter candidate region SR by using the trained model generated by the supervised training in which a plurality of images where spatters SP are shown and a plurality of images where spatters SP are not shown are used as the training data, and thus, it is difficult to detect, as spatter candidate region SR, a region including portions which are not spatters SP, such as shield gas or a part of the device as compared with a case where all the regions including a portion in which a plurality pixels other than black are continuous are detected as spatter candidate region SR. Therefore, the possibility of erroneous detection can be reduced.

Furthermore, in general, the larger spatters SP, the heavier spatters SP, and the lower the moving speed of spatters SP, so that the trajectory of spatters SP shown in one input image becomes shorter as spatters SP are larger. Therefore, even when a capturing range is narrowed, large spatters SP are more likely to fall within the capturing range than small spatters SP, and detection omission of large spatters SP is less likely to occur.

Note that, in the present exemplary embodiment, image processing unit 141*b* once converts the input images into the grayscale images in (S104), but the input images may not be converted into the grayscale image, and a pixel of which a pixel value indicating brightness exceeds a predetermined threshold may be directly identified from the input images.

Furthermore, in the present exemplary embodiment, spatter candidate region SR is detected using the trained model in (S105) to (S107), but all the regions having a predetermined shape and including a region in which a plurality of pixels other than black are continuous may be detected as spatter candidate region SR. Furthermore, all the regions having a predetermined shape and including a region in which pixels other than black are continuous only by greater than or equal to a first number and less than or equal to a second number (>first number) may be detected as spatter candidate region SR. In this case, since the region including a region in which the number of pixels other than black exceeds the second number and the pixels are continuous is not detected as spatter candidate region SR, it is possible to prevent erroneous detection of a region including portions which are not spatters SP as spatter candidate region SR.

Furthermore, in the present exemplary embodiment, in (S201) to (S203), the coordinates on the input images in which the number of times corresponding to the center coordinates of detected spatter candidate region SR is greater than or equal to the predetermined reference number of times are identified as the background bright spots. However, the coordinates on the input images in which the number of times corresponding to a predetermined position other than the center of detected spatter candidate region SR is greater than or equal to a predetermined reference number of times may be identified as the background bright spots. For example, the coordinates on the input images in which the number of times corresponding to the upper left coordinates of detected spatter candidate region SR is greater than or equal to a predetermined reference number of times may be identified as the background bright spots, and the correction processing of removing spatter candidate region SR in which the upper left coordinates are the background bright spots may be performed on each of lists SmallS, MiddleS, and LargeS.

Furthermore, in the present exemplary embodiment, in (S201) to (S203), the background bright spot coordinate list is created based on first spatter list ListGs of all the input images, and the background bright spot coordinate list is also used for the background bright spot region removal processing of small spatter list SmallS, middle spatter list MiddleS, and large spatter list LargeS in (S204). However, the background bright spot coordinate list created based on small spatter list SmallS of all the input images may be used for the background bright spot region removal processing of small spatter list SmallS, the background bright spot coordinate list created based on middle spatter list MiddleS of all the input images may be used for the background bright spot region removal processing of middle spatter list MiddleS, and the background bright spot coordinate list created based on large spatter list LargeS of all the input images may be used for the background bright spot region removal processing of large spatter list LargeS.

Furthermore, in the present exemplary embodiment, the average value calculation region AR is a square region having a center portion common to spatter candidate region SR, but may be another region such as a circular region having the center portion common to spatter candidate region SR as long as it is a region obtained by removing the outer peripheral portion in spatter candidate region SR. Furthermore, although the area of the average value calculation region AR is 90% of the area of spatter candidate region SR, other ratios may be employed as long as the area is less than 100%.

Furthermore, in the present exemplary embodiment, image processing unit 141*b* performs first list correction processing and second list correction processing in (S112) and (S113) on small spatter list SmallS, middle spatter list MiddleS, and large spatter list LargeS, but may perform only the second list correction processing in (S113) without performing the first list correction processing in (S112).

Furthermore, in the present exemplary embodiment, processed image I is obtained by performing, for the input images, the processing of applying frames F1, F2, and F3 to detected spatters SP, but processed image I may be obtained by applying a mark other than frames F1, F2, and F3.

Furthermore, in the present exemplary embodiment, image processing unit 141*b* of computer main body 141 receives the moving image including the input images from card reader 150, but may receive the moving image from another information transmission device.

Furthermore, in the present exemplary embodiment, the present disclosure is applied to the arc welding using welding robot 110, but the present disclosure can also be applied to a case where the welding torch is manually operated.

Furthermore, the present disclosure can also be applied to both a case where the voltage applied between workpiece 170 and welding wire 160 is not a pulse voltage and a case where the voltage is a pulse voltage.

INDUSTRIAL APPLICABILITY

The welding condition setting assistance device of the present disclosure can more accurately identify the number of spatters of the input images and is useful as a device that assists setting of a welding condition when arc welding is performed by generating an arc between a workpiece and an electrode by applying a voltage between the workpiece and the electrode.

REFERENCE MARKS IN THE DRAWINGS 140 computer (welding condition setting assistance device)
141*b* image processing unit
160 welding wire (electrode)
170 workpiece
A arc
SP spatter
SR spatter candidate region
HR high luminance region
CP reference pixel
T total number of sputters
α first set value
β second set value

The invention claimed is:

1. A welding condition setting assistance device for assisting setting of a welding condition when arc welding is performed by generating an arc between a workpiece and an electrode by applying a voltage between the workpiece and the electrode, the welding condition setting assistance device comprising:
   a processor,
   wherein the processor is configured to perform:
   a spatter candidate region detection step of performing, for each of input images obtained by capturing the workpiece during the arc welding, detection of a spatter candidate region based on a pixel value indicating brightness of a pixel included in the input images;
   a reflected light region identification step of identifying, in the spatter candidate region detected in the spatter candidate region detection step, a reflected light region in which reflected light of arc light is shown, based on color information of a predetermined reference pixel included in the spatter candidate region; and a spatter number identification step of identifying, as a number of spatters of each of the input images, a number of spatter candidate regions obtained by removing the reflected light region identified in the reflected light region identification step in the spatter candidate region of each of the input images, the spatter candidate region being detected in the spatter candidate region detection step,
wherein:
the color information of the predetermined reference pixel is defined by an RGB color space; and
in the reflected light region identification step, the spatter candidate region that satisfies a condition is identified as the reflected light region, the condition being that an average value of a green component in the color information of the predetermined reference pixel is greater than a product of a first set value of greater than or equal to one and an average value of a red component in the color information of the predetermined reference pixel, and an average value of a blue component in the color information of the predetermined reference pixel is greater than a product of a second set value of greater than or equal to one and the average value of the red component in the color information of the predetermined reference pixel.

2. The welding condition setting assistance device according to claim 1, wherein the spatter candidate region includes a high luminance region in which a plurality of the pixels are continuous, the pixel value of each of the plurality of the pixels indicating brightness exceeding a predetermined threshold.

3. The welding condition setting assistance device according to claim 2, wherein:
the high luminance region is in a region excluding an outer peripheral portion of the spatter candidate region; and
the predetermined reference pixel is in the region excluding the outer peripheral portion of the spatter candidate region.

4. The welding condition setting assistance device according to claim 1, wherein:
the processor is further configured to perform a background bright spot region identification step of identifying, as a background bright spot region, a region in which a number of times of detection as the spatter candidate region in the spatter candidate region detection step is greater than or equal to a predetermined reference number of times; and
in the spatter number identification step, the number of spatter candidate regions obtained by removing the reflected light region identified in the reflected light region identification step and the background bright spot region identified in the background bright spot region identification step is identified as the number of spatters of each of the input images in the spatter candidate region of each of the input images, the spatter candidate region being detected in the spatter candidate region detection step.

* * * * *